United States Patent
Schwarzbauer et al.

(10) Patent No.: US 9,813,902 B2
(45) Date of Patent: Nov. 7, 2017

(54) METHOD OF MANAGEMENT IN A COMMUNICATIONS NETWORK

(71) Applicant: Nokia Solutions and Networks Oy, Espoo (FI)

(72) Inventors: Hanns Juergen Schwarzbauer, Grobenzell (DE); Alexander Vesely, Feldbach (AT); Richard Waldhauser, Munich (DE); Johanna Katariina Pekonen, Espoo (FI); Srinivasan Selvaganapathy, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/358,855

(22) PCT Filed: Oct. 18, 2012

(86) PCT No.: PCT/EP2012/070629
§ 371 (c)(1),
(2) Date: May 16, 2014

(87) PCT Pub. No.: WO2013/064379
PCT Pub. Date: May 10, 2013

(65) Prior Publication Data
US 2014/0313982 A1    Oct. 23, 2014

(30) Foreign Application Priority Data
Nov. 4, 2011  (IN) ............................ 3786/CHE/2011

(51) Int. Cl.
*H04W 8/26* (2009.01)
*H04W 36/00* (2009.01)

(52) U.S. Cl.
CPC .......... *H04W 8/26* (2013.01); *H04W 36/0055* (2013.01)

(58) Field of Classification Search
CPC ... H04W 8/26; H04W 36/0055; H04W 36/00; H04W 8/00; H04W 72/02;
(Continued)

(56) References Cited

U.S. PATENT DOCUMENTS

2009/0264095 A1* 10/2009 Khetawat .............. H04L 63/104
                                                    455/404.2
2010/0041402 A1*  2/2010 Gallagher ............... H04W 8/02
                                                    455/435.1
(Continued)

FOREIGN PATENT DOCUMENTS

GB    2 473 882 A      3/2011
WO    WO 2011/134529 A1   11/2011

OTHER PUBLICATIONS

GPP TSG-RAN WG3 Meeting RAN3 ad Hoc, Beijing, China, Jun. 29-Jul. 1, 2010, R3-101952, "Scalable enhanced HNB mobility solution" Nokia Siemens Networks, 5 pgs.
(Continued)

*Primary Examiner* — Charles C Jiang
*Assistant Examiner* — Rose Clark
(74) *Attorney, Agent, or Firm* — Harrington & Smith

(57) ABSTRACT

A method including maintaining a database of unique radio network identifiers within a home node B gateway, wherein the unique radio network identifier uniquely identifies the radio network termination point of user equipment attached to a radio node controlled by the home node B gateway.

33 Claims, 10 Drawing Sheets

(58) Field of Classification Search
CPC . H04W 72/1226; H04W 76/00; H04W 36/08; H04W 84/045; H04W 88/16; H04W 88/08
See application file for complete search history.

(56) References Cited

U.S. PATENT DOCUMENTS

| | | | | |
|---|---|---|---|---|
| 2010/0041405 | A1* | 2/2010 | Gallagher | H04W 8/02 455/436 |
| 2010/0112982 | A1* | 5/2010 | Singh | H04L 63/101 455/411 |
| 2010/0203891 | A1* | 8/2010 | Nagaraja | H04W 36/08 455/436 |
| 2012/0015655 | A1* | 1/2012 | Lee | H04W 8/02 455/435.1 |
| 2012/0196598 | A1* | 8/2012 | Ganapathy | H04W 36/0055 455/435.1 |
| 2012/0257581 | A1* | 10/2012 | De | H04W 8/18 370/329 |
| 2012/0289178 | A1* | 11/2012 | Matsumura | H04W 52/0206 455/403 |
| 2013/0045732 | A1* | 2/2013 | Vikberg | H04W 76/027 455/422.1 |
| 2013/0150037 | A1* | 6/2013 | Jha | H04W 36/0005 455/435.1 |

OTHER PUBLICATIONS

3GPP TSG-RAN WG3 Meeting #74, San Francisco, USA, Nov. 14-18, 2011, R3-112870, "U-RNTI management by the HNB-GW", R3-112870, Nokia Siemens Networks, 6 pgs.

3GPP TSG-RAN3 Meeting #74, San Francisco, USA, Nov. 14-18, 2011, R3-112808, "Enhanced HNB mobility in CELL_FACH", Alcatel-Lucent, 8 pgs.

3GPP TSG RAN WG3 Meeting #61, Jeju, Korean, Aug. 18-22, 2008, R3-082035, "Some Identifiers Consideration for 3G HNB", Huawei, 3 pgs.

* cited by examiner

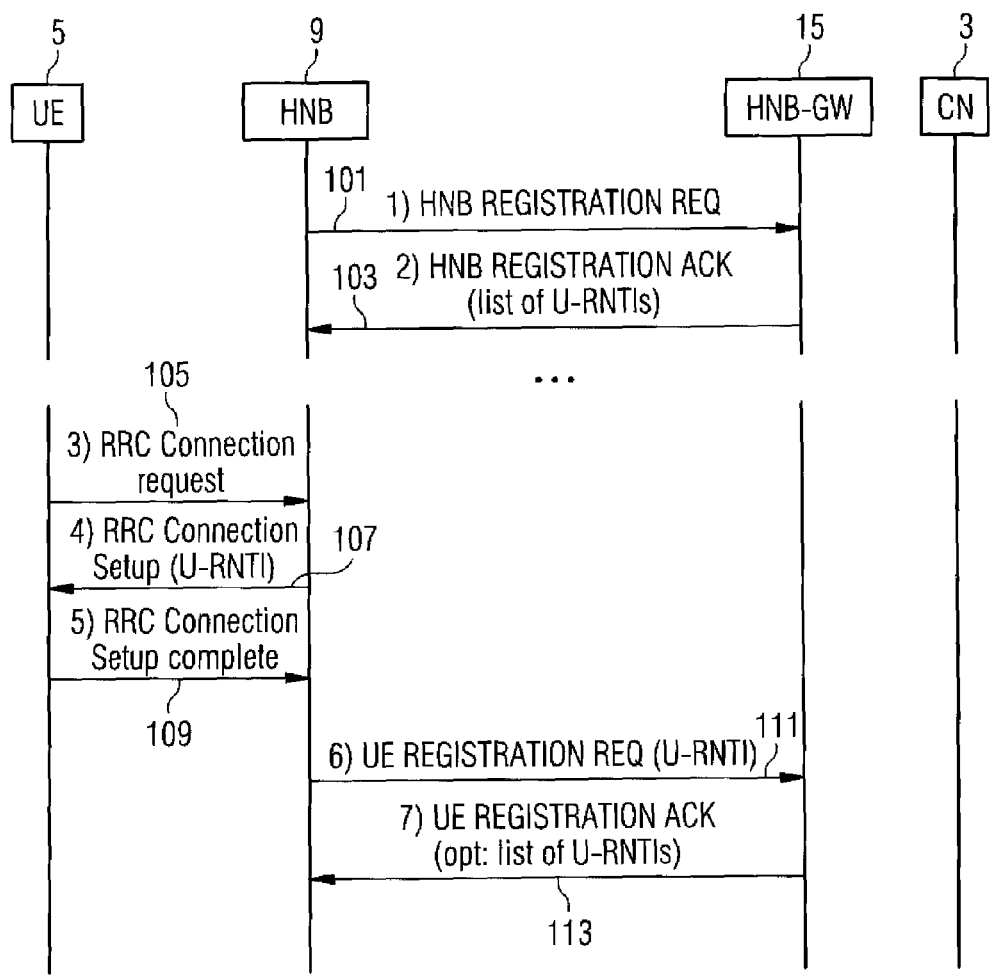

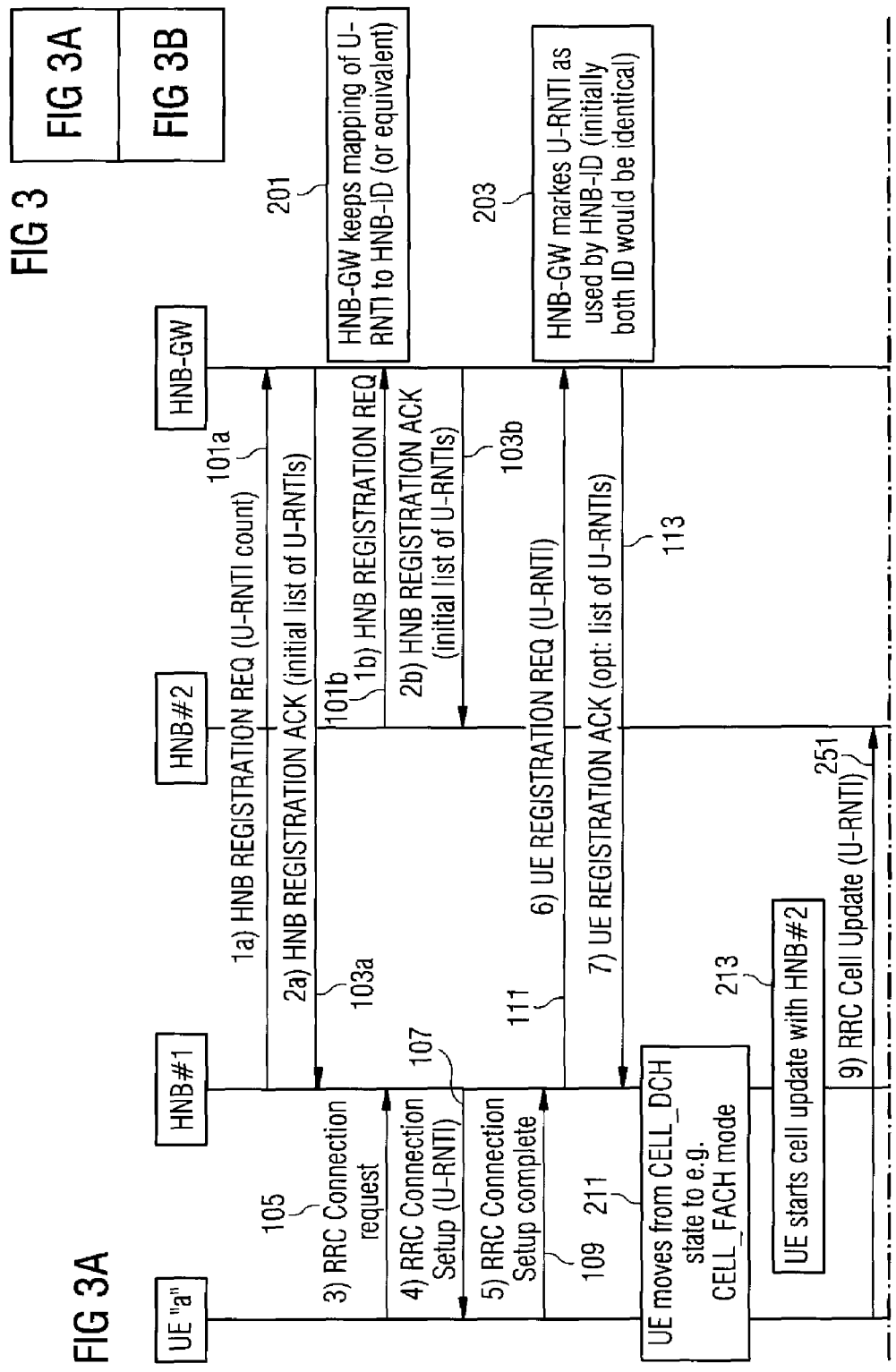

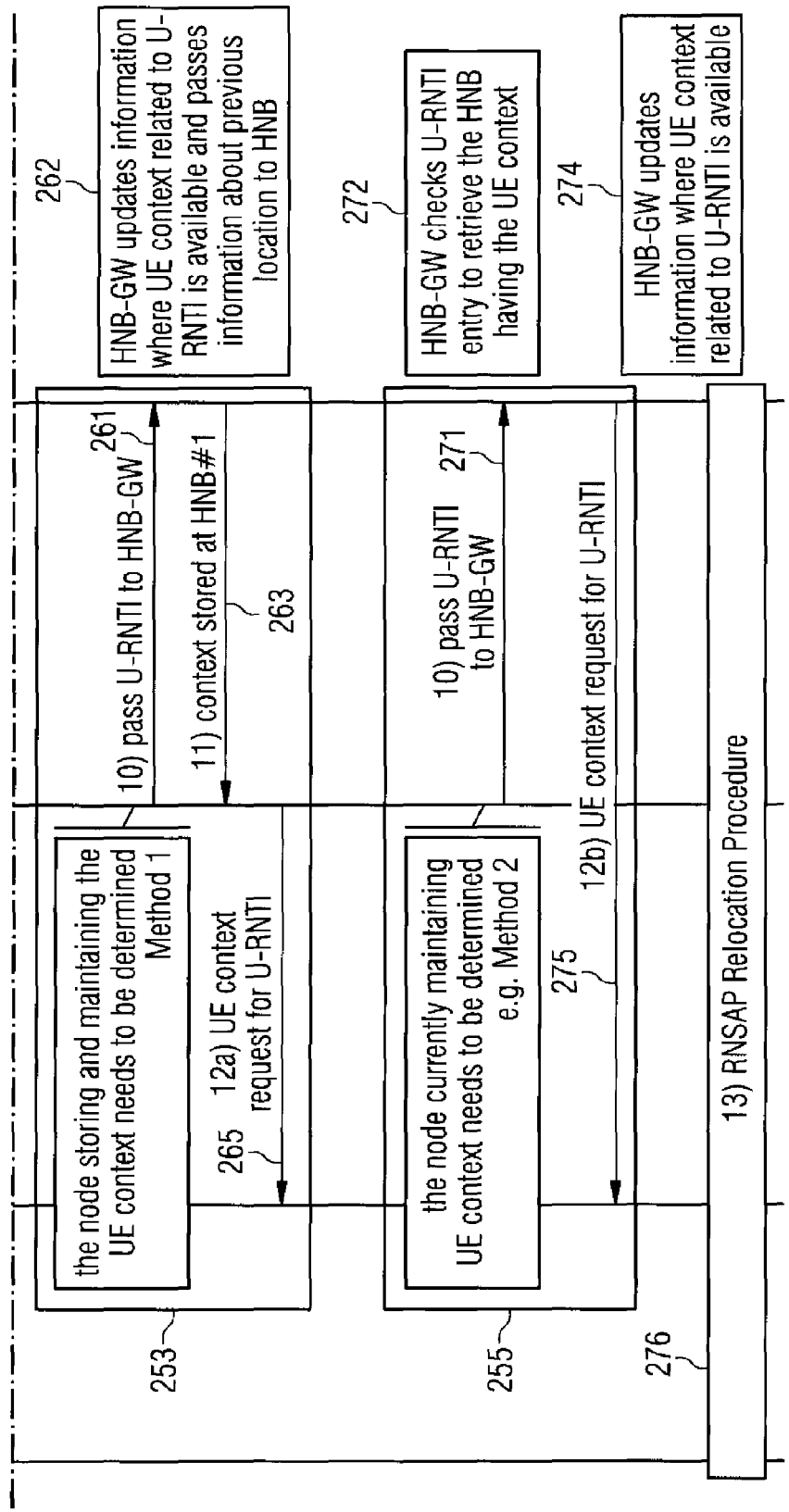

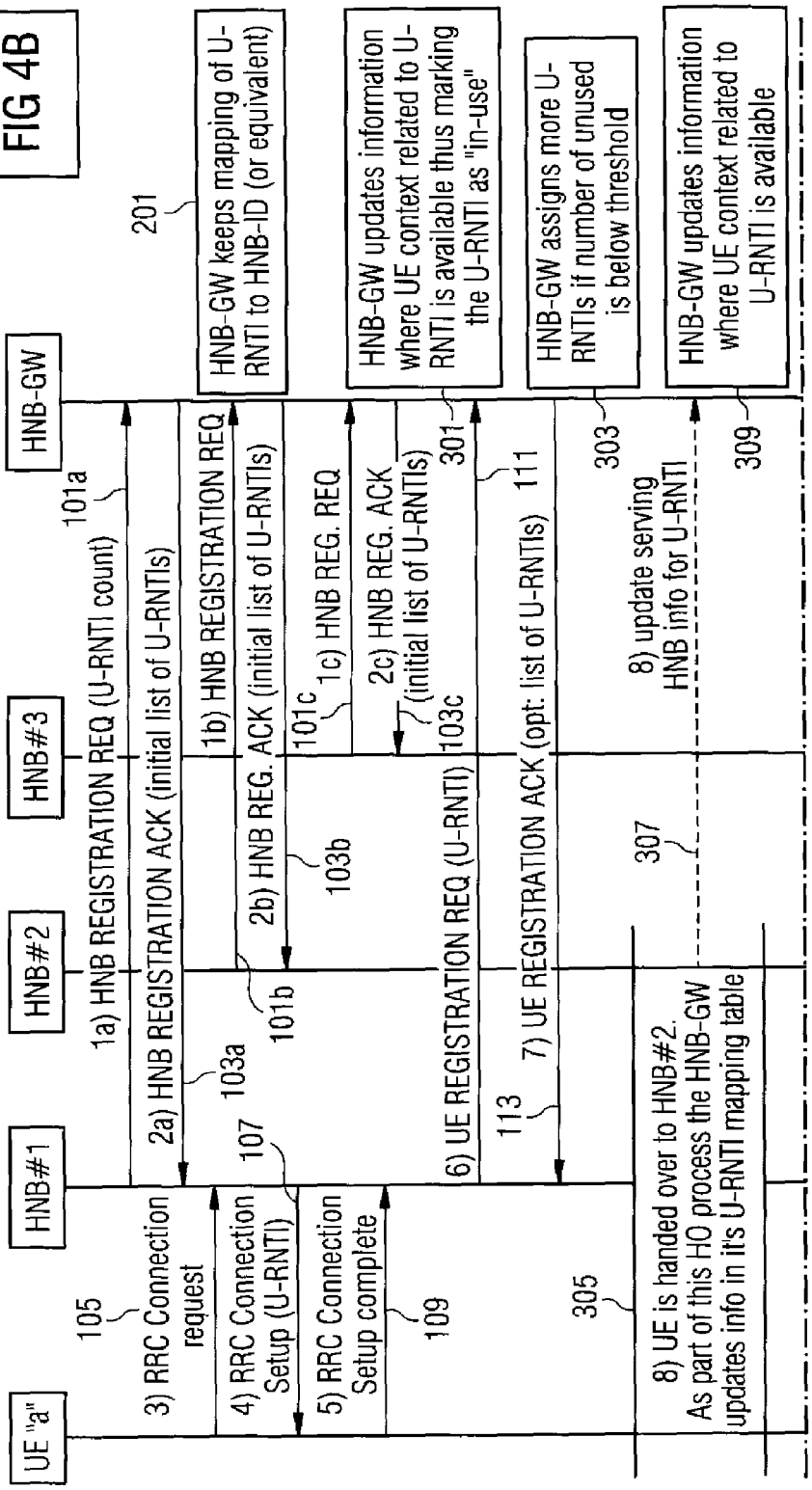

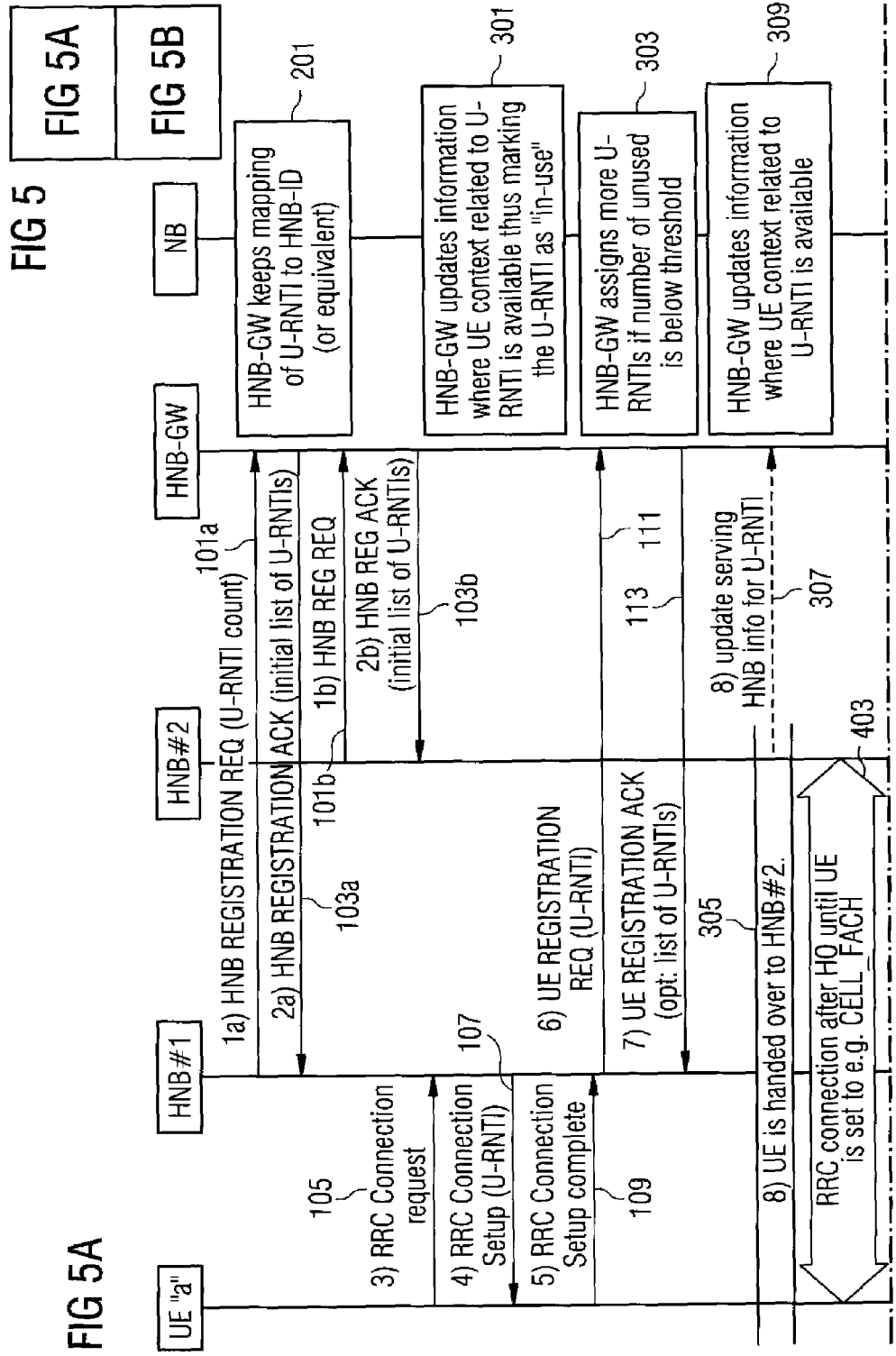

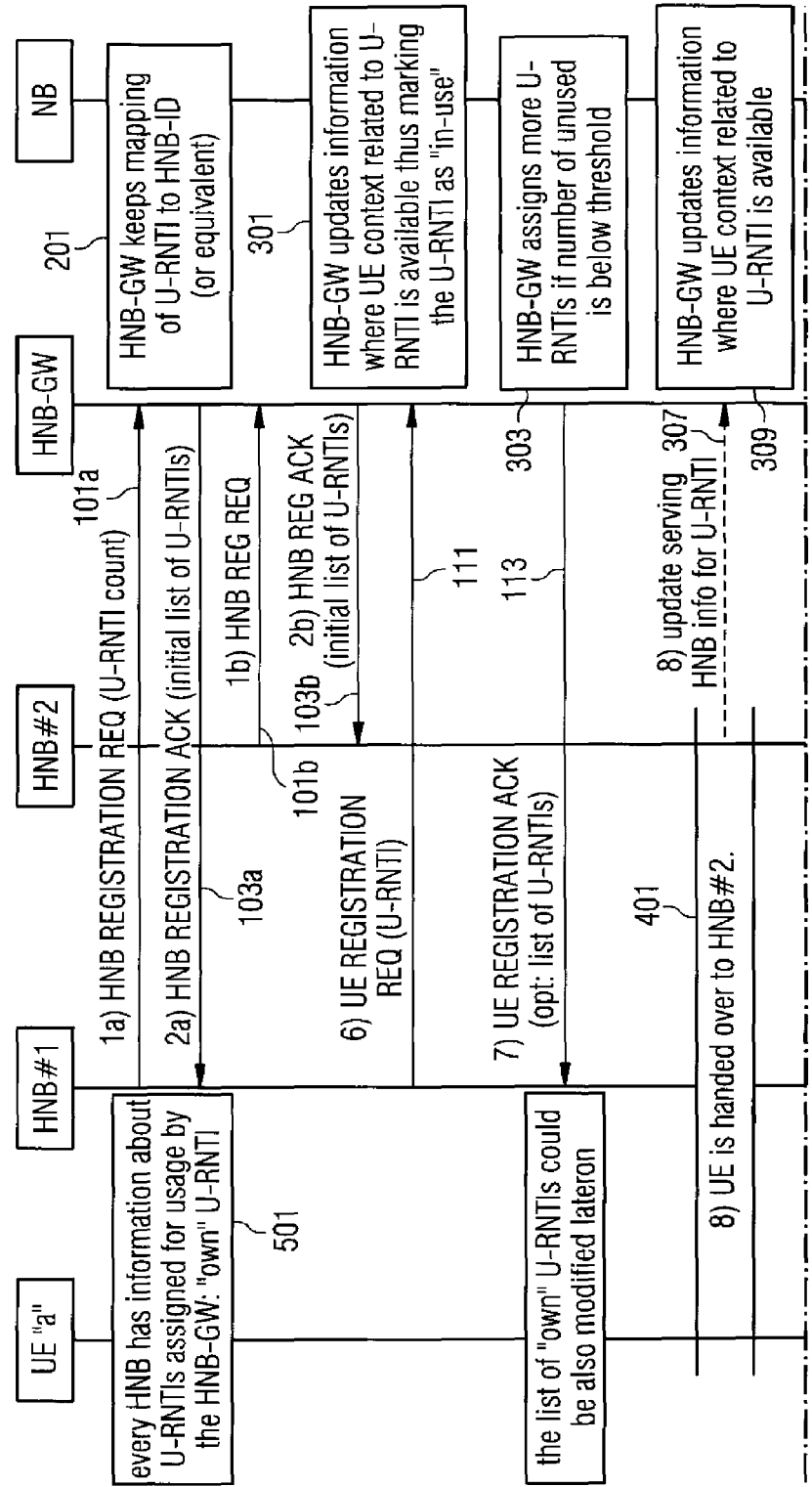

METHOD OF MANAGEMENT IN A COMMUNICATIONS NETWORK

FIELD OF THE APPLICATION

The application generally relates to a method of management in a communications network. More particularly but not exclusively the application relates to method of centralized management of radio network identifiers for home node B access devices.

BACKGROUND OF THE APPLICATION

A communication system can be seen as a facility that enables communication sessions between two or more nodes such as fixed or mobile communication devices, base stations, servers and so on. A communication system and compatible communicating nodes typically operate in accordance with a given standard or specification which sets out what the various entities associated with the system are permitted to do and how that should be achieved. For example, the standards, specifications and related protocols can define the manner how various aspects of communication shall be implemented between communicating devices. A communication can be carried on wired or wireless carriers.

In a wireless communication system at least a part of communications between the nodes occurs over one of more wireless links. Examples of wireless systems include public land mobile networks (PLMN) such as cellular networks, satellite based communication systems and different wireless local systems, for example wireless local area networks (WLAN) and base stations providing local service areas. A wireless system can be divided into cells or other radio coverage or service areas. A radio service area is provided by a base station. Radio service areas can overlap, and thus a communication device in an area can typically send signals to and receive signals from more than one base station or radio node. An example of wireless communication systems is an architecture that is being standardized by the 3rd Generation Partnership Project (3GPP).

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment. The communication device may access a carrier provided by a base station and transmit and/or receive communications on the carrier.

A communication system can comprise different types of radio service areas providing transmission/reception points for the users. Network nodes can also be small or local radio service area network nodes. Such nodes are called, for example, home node Bs (HNB) or femto nodes and pico NodeBs (pico-NB). Just to give an example, the range of a picocell is 200 meters or less, and a femtocell is on the order of 10 meters. The smaller radio service areas can be located wholly or partially within a larger radio service area.

A user equipment may thus be located within, and thus communicate with, more than one radio service area. The nodes of the smaller radio service areas may be configured to support local offload. The local radio nodes can also, for example, be configured to extend the range of a cell.

Typically a number of home NodeBs (HNBs) are connected or coupled to one single Home NodeB Gateway (HNB-GW), the number of which can be very high (of the order of thousands), for example in typical enterprise scenarios.

The HNB together with the HNB-GW provides the same set of functions as provided by the radio network controller (RNC) together with the node B (NB). The main difference being the division of functions between the HNB/HNB-GW and NB/RNC.

Although the HNB/HNB-GW appears to the Core Network like an RNC/NB, it does not exert strict control of the radio interface using the node B application protocol (NBAP) via the Iub interface. The HNB/HNB-GW combination applies a looser control of the HNB operation via a HNB application protocol (HNBAP) via the Iuh interface. HNBAP provides a set of functions to register HNBs and in turn individual UEs to allow integration into the existing UTRAN architecture. However, the individual HNBs to a large degree operate independently from each other, resulting in specific problems. For example, there are problems when the UE initiates a Cell Update procedure.

When on common radio resources, the relevant UE context is identified by the UTRAN-Radio Network Temporary Identifier (U-RNTI) field sent by the UE to the target HNB via the RRC Cell Update message. A U-RNTI is assigned to the UE by the HNB during the RRC connection establishment procedure so that each UE having an RRC connection in that particular HNB gets a different U-RNTI value. In order to retrieve the relevant UE context during relocation from one HNB to another, it is required that the U-RNTI is also unique within all HNBs controlled by a particular HNB-GW.

3GPP UMTS specifications allow a UE to enter the "CELL_FACH", "CELL_PCH" or "URA_PCH" states under specific conditions. One of those conditions is a UE that once was in CELL_DCH (dedicated physical channel state) and had dedicated resources assigned, but released those dedicated Uu resources as no (or in case of CELL_FACH: only minor) data exchange took place. Leaving CELL_DCH allows for reducing power consumption and therefore battery drain. The UE context is kept within the network after the state change, in other words the UTRAN-Radio Network Temporary Identifier (U-RNTI) value that was assigned when establishing an RRC connection is still kept assigned to the UE.

Once the UE decides to go back to CELL_DCH state, it uses the still assigned U-RNTI in the RRC Cell Update message. The receiving RNC then can use this value to ask the assigning (in other words still controlling) node to relocate the UE-context to the receiving node. As far as RNCs concerned, the receiving node RNC can easily deduce from the U-RNTI value the RNC originally assigning the U-RNTI value. However, where the U-RNTI was assigned by an HNB, the node receiving the Cell Update, can only address the HNB-GW but not the HNB still holding the UE context. The reason being that in HNB architecture there is no central unit which ensures uniqueness of U-RNTI values assigned by HNBs served by the same HNB-GW and furthermore that the HNB-GW has no knowledge about which HNB assigns specific U-RNTI values.

Approaches to ensure the assignment of a unique U-RNTI whenever an UE starts establishing a new RRC connection are to use a value selected at random by the HNB and modify it afterwards when the non-uniqueness has been detected by the HNB-GW, or to use the next available value out of a range of U-RNTI values assigned statically by the HNB-GW for exclusive use of the HNB, or the UE informs the source HNB about its intent to reselect to a defined target HNB and the source HNB in turn informs the target HNB accordingly. However these are problematic even the first two methods do not require modified behaviour of the UE, whereas the third method requires changes to UE behaviour. Furthermore the first method adds additional delay due to the modification of the U-RNTI and the second method lacks of flexibility.

SUMMARY OF THE APPLICATION

Accordingly, the invention provides a method of assigning a unique identifier to a mobile station in a communications network.

According to first aspect there is provided a method comprising: maintaining a database of unique radio network identifiers within a home node B gateway, wherein the unique radio network identifier uniquely identifies the radio network termination point of user equipment attached to a radio node controlled by the home node B gateway.

Maintaining the database of unique radio network identifiers may comprise associating at least one radio network identifier to a radio node identifier within the database.

The method may further comprise allocating at least one unique radio network identifier to a radio node, wherein associating at least one unique radio network identifier to a radio node identifier within the database is performed in response to allocating the at least one unique radio network identifier with the radio node identifier.

Associating at least one unique radio network identifier to a radio node identifier may be performed in response to receiving at least one registration request.

The registration request may comprise at least one of: a radio node registration request; and a user equipment registration request.

Allocating at least one unique radio network identifier in response to receiving at least one user equipment registration request may comprise allocating at least one unique radio network identifier dependent on determining the number of unassigned unique radio network identifiers associated with the radio node identifier, transmitting the user equipment registration request, is less than a determined threshold.

The method may further comprise transmitting to the radio node a message comprising the at least one unique radio network identifier.

Maintaining a database of unique radio network identifiers within a home node B gateway may comprise indicating at least one unique radio network identifier initially associated with a radio node identifier has been assigned to a UE by the radio node.

Maintaining a database of unique radio network identifiers within a home node B gateway may comprise: receiving a message comprising a unique radio network identifier from a requesting node; determining in the database a radio node identifier initially associated with the received unique radio network identifier; and associating an identifier value dependent on the unique radio network identifier value with the identifier of the requesting node.

The requesting node may be a different radio node to the radio node initially associated with the unique radio network identifier, and wherein associating the unique radio network identifier value with the requesting node identifier may comprise: defining an owned association with the radio node identifier associated with the unique radio network identifier; and defining a visiting association with the requesting radio node identifier.

The requesting node may be a macro node B, and associating the unique radio network identifier value with the requesting node may comprise: updating the database to indicate the unique radio network identifier value is available for further allocation.

The method may further comprise informing the radio node that the unique radio network identifier is available for new allocation.

Maintaining the database of radio network identifiers may comprise: transmitting a request about radio network identifier information to at least one radio node; receiving a response from the at least one radio node comprising available information about radio network identifiers; auditing or re-compiling the database of radio network identifiers in the home node B gateway from the response.

The response may comprise an indication of whether the allocated radio network identifier was initially allocated in response to a registration request.

Maintaining a database of unique radio network identifiers within a home node B gateway may comprise the allocation of radio network identifier values for a home node B having a radio network controller identifier value assigned within a first range of values and ensuring that the assigned radio network identifiers as assigned are collision free compared with those containing an radio network identifier from the second range.

The radio network controller identifier value first range of values may be identifier values less than a predefined value.

The radio node may be a home node B.

According to a second aspect there is provided an apparatus comprising: means for maintaining a database of unique radio network identifiers within a home node B gateway, wherein the unique radio network identifier uniquely identifies the radio network termination point of user equipment attached to a radio node controlled by the home node B gateway.

The means for maintaining the database of unique radio network identifiers may comprise means for associating at least one radio network identifier to a radio node identifier within the database.

The apparatus may further comprise means for allocating at least one unique radio network identifier to a radio node, wherein associating at least one unique radio network identifier to a radio node identifier within the database is performed in response to allocating the at least one unique radio network identifier with the radio node identifier.

The means for associating at least one unique radio network identifier to a radio node identifier may operate in response to receiving at least one registration request.

The registration request may comprise at least one of: a radio node registration request; and a user equipment registration request.

The means for allocating at least one unique radio network identifier may comprise means for allocating at least one unique radio network identifier dependent on determining the number of unassigned unique radio network identifiers associated with the radio node identifier, transmitting the user equipment registration request, is less than a determined threshold.

The apparatus may further comprise means for transmitting to the radio node a message comprising the at least one unique radio network identifier.

The means for maintaining a database of unique radio network identifiers within a home node B gateway may comprise means for indicating at least one unique radio network identifier associated with a radio node identifier has been assigned to a UE by the radio node.

The means for maintaining a database of unique radio network identifiers within a home node B gateway may comprise: means for receiving a message comprising a unique radio network identifier from a requesting node; means for determining in the database a radio node identifier initially associated with the unique radio network identifier; and means for associating an identifier value dependent on the unique radio network identifier value with the identifier of the requesting node.

The requesting node may be a different radio node to the radio node initially associated with the unique radio network identifier, and wherein the means for associating the unique radio network identifier value with the requesting node identifier may comprise: means for defining an owned association with the radio node identifier associated with the unique radio network identifier; and means for defining a visiting association with the requesting radio node identifier.

The requesting node may be a macro node B, and the means for associating the unique radio network identifier value with the requesting node may comprise means for updating the database to indicate the unique radio network identifier value is available for further allocation.

The apparatus may further comprise means for informing the radio node that the unique radio network identifier is available for new allocation.

The means for maintaining the database of radio network identifiers may comprise: means for transmitting a request about radio network identifier information to at least one radio node; means for receiving a response from the at least one radio node comprising at least one allocated radio network identifier; and means for auditing or re-compiling the database of radio network identifiers in the home node B gateway from the response.

The response may comprise an indication of whether the allocated radio network identifier was allocated in response to a registration request.

The means for maintaining a database of unique radio network identifiers within a home node B gateway may comprise the means for allocation of radio network identifier values for a home node B having a radio network controller identifier value assigned within a first range of values and means for ensuring that the assigned radio network identifiers as assigned are collision free compared with those containing an radio network identifier from the second range.

The radio network controller identifier value first range of values may be identifier values less than a predefined value.

The radio node may be a home node B.

According to a third aspect there is provided an apparatus comprising at least one processor and at least one memory including computer program code, the at least one memory and computer program code configured, with the at least one processor, to cause the apparatus to perform: maintaining a database of unique radio network identifiers within a home node B gateway, wherein the unique radio network identifier uniquely identifies the radio network termination point of user equipment attached to a radio node controlled by the home node B gateway.

Maintaining the database of radio network identifiers may cause the apparatus to perform initially associating at least one unique radio network identifier with a radio node identifier within the database.

The apparatus further caused to perform allocating at least one unique radio network identifier to a radio node, wherein associating at least one unique radio network identifier to a radio node identifier within the database is performed in response to allocating the at least one unique radio network identifier with the radio node identifier.

Allocating at least one radio network identifier to a home node B may be caused to be performed in response to receiving at least one registration request.

Associating at least one unique radio network identifier to a radio node identifier may be performed in response to receiving at least one registration request.

The registration request may comprise at least one of: a radio node registration request; and a user equipment registration request.

Allocating at least one unique radio network identifier in response to receiving at least one user equipment registration request may cause the apparatus to allocate at least one unique radio network identifier dependent on determining the number of unassigned unique radio network identifiers associated with the radio node identifier, transmitting the user equipment registration request, is less than a determined threshold.

The apparatus may be further caused to perform transmitting to the radio node a message comprising the at least one unique radio network identifier.

Maintaining a database of unique radio network identifiers within a home node B gateway may cause the apparatus to perform indicating at least one unique radio network identifier initially associated with a radio node identifier has been assigned to a UE by the radio node.

Maintaining a database of unique radio network identifiers within a home node B gateway may cause the apparatus to perform: receiving a message comprising a unique radio network identifier from a requesting node; determining in the database a radio node identifier initially associated with the received unique radio network identifier; and associating an identifier value dependent on the unique radio network identifier value with the identifier of the requesting node.

The requesting node may be a different radio node to the radio node initially associated with the unique radio network identifier, and wherein associating the unique radio network identifier value with the requesting node identifier may cause the apparatus to perform: defining an owned association with the radio node identifier associated with the unique radio network identifier; and defining a visiting association with the requesting radio node identifier.

The requesting node may be a macro node B, and associating the unique radio network identifier value with the requesting node may cause the apparatus to perform updating the database to indicate the unique radio network identifier value is available for further allocation.

The apparatus may be further caused to perform informing the radio node that the unique radio network identifier is available for new allocation.

Maintaining the database of radio network identifiers may cause the apparatus to perform: transmitting a request about radio network identifier information to at least one radio node; receiving a response from the at least one radio node comprising available information about radio network identifiers; and auditing or re-compiling the database of radio network identifiers in the home node B gateway from the response.

The response may comprise an indication of whether the allocated radio network identifier was initially allocated in response to a registration request.

Maintaining a database of unique radio network identifiers within a home node B gateway may cause the apparatus to perform the allocation of radio network identifier values for a home node B having a radio network controller identifier value assigned within a first range of values and ensuring that the assigned radio network identifiers as assigned are collision free compared with those containing an radio network identifier from the second range.

The radio network controller identifier value first range of values may be identifier values less than a predefined value.

The radio node may be a home node B.

According to a fourth aspect there is provided a method of auditing a database of unique radio network identifiers within a home node B gateway, wherein the unique radio network identifier uniquely identifies the radio network termination point of user equipment attached to a radio node controlled by the home node B gateway, wherein the method comprises: transmitting a request about unique radio network identifier information to at least one radio node; receiving a response from the at least one radio node comprising at least one allocated unique radio network identifier; auditing the database of unique radio network identifiers in the home node B gateway from the response.

According to a fifth aspect there is provided an apparatus comprising: means for auditing a database of unique radio network identifiers within a home node B gateway, wherein the unique radio network identifier uniquely identifies the radio network termination point of user equipment attached to a radio node controlled by the home node B gateway wherein the means for auditing includes: means for transmitting a request about unique radio network identifier information to at least one radio node; means for receiving a response from the at least one radio node comprising at least one allocated unique radio network identifier; and means for auditing the database of unique radio network identifiers in the home node B gateway from the response.

According to a sixth aspect there is provided an apparatus comprising at least one processor and at least one memory including computer program code, the at least one memory and computer program code configured, with the at least one processor, to cause the apparatus to perform a method of auditing a database of unique radio network identifiers within a home node B gateway, wherein the unique radio network identifier uniquely identifies the radio network termination point of user equipment attached to a radio node controlled by the home node B gateway, wherein the apparatus is caused to perform: transmitting a request about unique radio network identifier information to at least one radio node; receiving a response from the at least one radio node comprising at least one allocated unique radio network identifier; auditing the database of unique radio network identifiers in the home node B gateway from the response.

A computer program may comprise computer executable instructions which when run on one or more processors perform the method as disclosed herein.

The unique radio network identifier may be a U-RNTI.

The invention will now be described, by way of example only, with reference to specific embodiments, and to the accompanying drawings, in which:

BRIEF DESCRIPTION OF THE DRAWINGS

FIGS. 2 to 6 are message flow diagrams illustrating methods according to some embodiments.

DETAILED DESCRIPTION OF EXEMPLARY EMBODIMENTS

Figure 1:
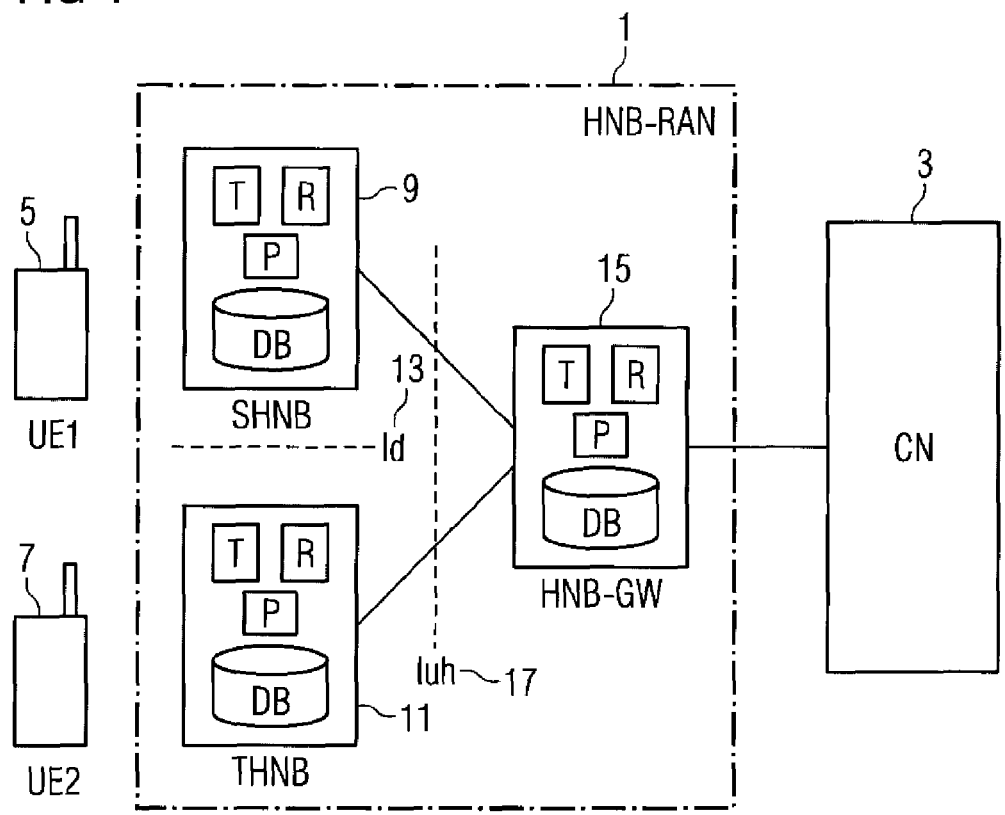
FIG. 1 shows a schematic diagram of a network according to some embodiments.

FIG. 1 shows a wireless communications network, which includes a home NodeB radio access network HNB-RAN 1 coupled to a core network CN 3. Although the following examples have been described with reference to a HNB-RAN network 1, the invention could also be applied in any other similar wireless network.

The HNB-RAN 1 includes two home NodeBs (HNB) as network nodes for providing access to the HNB-RAN network for mobile stations UE1 5 and UE2 7. The home NodeBs are designated as a source home NodeB SHNB 9 and a target home NodeB THNB 11 and are structurally the same, including a transmitter T, a receiver R, a processor P and a database DB. The home NodeBs SHNB 9 and THNB 11 are able to generate temporary identifier values (U-RNTIs) for the mobile stations UE1 5, UE2 7. The SHNB 9 and THNB 11 can communicate over a direct physical interface Id 13 or via their control node, which is a home NodeB gateway HNB-GW 15. The mobile station UE1 5, UE2 7 accesses the HNB-RAN 1 via one of the home NodeB, for example the source home NodeB SHNB 9, but may be relocated from the SHNB 9 to the THNB 11 if needed.

The home NodeBs SHNB 9 and THNB 11 are coupled to the home NodeB gateway HNB-GW 15 over an interface Iuh 17. The HNB-GW 15 acts as a control node or gateway node for controlling the home NodeBs SHNB 9, THNB 11 and coupling them to the core network CN 3. Of course, in reality, many home NodeBs (of the order of thousands) would be controlled by the HNB-GW 15 but only two are shown here for the sake of clarity.

The HNB-GW 15 includes a transmitter T and a receiver R, which can receive a temporary unique identifier (U-RNTI) for the mobile station UE1, UE2 accessing the network. A processor P for processing functions of the HNB-GW 15 and a database DB is included for storing mobile station identifiers and other mobile-station related information, such as UE context information.

In some embodiments of the application the HNB-GW 15 can store within its database DB information related to the assignment of the U-RNTI values. Furthermore the processor of the HNB-GW can be configured in some embodiments to manage the U-RNTI assignment. In some embodiments the information stored in the HNB-GW database can comprise the identity of the HNB that the U-RNTI was initially assigned to, the identity of the HNB that currently maintains the UE context, and furthermore in some embodiments optional information about the current user equipment state, for example whether the user equipment is in a CELL_DCH state, CELL_FACH state, CELL_PCH state, or URA_PCH state.

In some embodiments the HNB-GW database can further store information about whether the U-RNTI has been assigned to the user equipment or not assigned. Although this information could be deduced implicitly based on the field providing the HNB identity by defining it explicitly it can assist in the processing as described herein.

Furthermore the HNB-GW ability to manage the U-RNTI assignment process can comprise the following management functions.

In some embodiments the HNB-GW management function can be configured to inform a requesting HNB about a list of U-RNTI values for exclusive assignment to attaching UEs.

Furthermore in some embodiments the HNB-GW management function could in enable HNBs to request a number of U-RNTI value depending on either the HNB capacity or on expected UE behaviour.

In some embodiments the HNB-GW can be configured to assign an additional set of U-RNTI values to HNBs if required. The necessity for assigning additional values can in some embodiments be either automatic or automatically detected by the HNB-GW or reported by the HNB. This information can in some embodiments be conveyed in a separate message or be piggybacked or encapsulated as one of the next messages suitable to also carry information about U-RNTIs. For example in some embodiments this information about U-RNTIs can be in the UE registration acknowledgement message.

In some embodiments the HNB-GW can be configured to inform the HNB receiving the initial assignment of a specific U-RNTI when the UE is no longer in a connected mode with one of the HNBs served by the HNB-GW. This functionality can in some embodiments include a timer based release procedure. The information in some embodiments could be either conveyed in a separate message or piggybacked or encapsulated as one of the next messages suitable. For example a suitable message which also carries information about U-RNTI is the UE registration acknowledgment message.

In some embodiments the HNB-GW can be configured to inform an HNB presenting a certain U-RNTI value about the HNB that last reported to have served the concerned user equipment.

Furthermore in some embodiments the HNB-GW could be configured to pass the received cell update message containing a given U-RNTI message directly to the concerned HNB after having retrieved information about the HNB that last reported to have served the requesting user equipment. Furthermore in some embodiments the HNB-GW can be configured to receive and store information about the RRC connection state of the user equipment assigned a specific or certain U-RNTI value.

In some embodiments the HNB-GW can be configured to perform an audit procedure to enable the HNB-GW to check the validity or rebuild the U-RNTI information centrally stored. In some embodiments during the HNB-registration process the HNB-GW can be configured to provide a list of U-RNTI values or a first U-RNTI value together with information on how many subsequent values are also assumed as available for exclusive usage by the HNB. When a HNB initiates the registration process with the HNB-GW, it can be configured to provide an indication of how many U-RNTI values it would like to get assigned. The reason behind this is that the number of user equipment a HNB is able to support can differ between HNBs having an Iuh interface with the same HNB-GW. A further reason for assigning a different number of U-RNTI values even in case HNBs can serve the same number of users is that some HNBs may be those that a user equipment attaches to first before being handed over to a further HNB. For example this could occur during an enterprise or mall scenario. The U-RNTI once assigned by a HNB is not changed until the user equipment leaves the coverage area of the HNBs connected to the same HNB-GW. For example when handed over to a macro node B. Procedures described herein show the application of such a centrally managed U-RNTI assignment scheme.

To allow for a mixed deployment of HNBs supporting central U-RNTI management and HNBs not supporting central U-RNTI management, the HNB-GW should in some embodiments be configured to assign an extended RNC-ID to those HNBs not supporting central management of U-RNTIs. HNB Registration process (TS 25.469 clause 9.2.26) allows the HNB-GW to assign an RNC-ID of up to 16 bits to HNBs where values larger than 4095 are considered to be "extended RNC-IDs". The assignment of the extended RNC-ID needs to be done in a way to ensure that bits 1 up to 12 are identical with the RNC-ID assigned to HNBs supporting central management of U-RNTI values.

In this way, the U-RNTIs allocated by HNBs not supporting central U-RNTI management are distinguishable from U-RNTIs allocated for UEs served by HNBs supporting central U-RNTI management, if the HNB-GW does not allocate U-RNTIs prefixed with the extended RNC-IDs provided to non-supporting HNBs during HNB Registration.

Hence U-RNTI values assigned to HNBs supporting central management of U-RNTI must not be assigned as extended RNC-ID values from a second range of values. U-RNTI values containing an extended RNC-ID must be different from those U-RNTI values assigned by HNBs not having an extended RNC-ID from a first range of values.

All HNBs served by one HNB-GW share the same RNC-ID considering bits 1 to 12 only. This is essential to ensure that all HNBs served by an HNB-GW are seen as one single RNC from the Core Network. The HNB-GW procedure assigning centrally managed U-RNTI values needs to be designed in a way to not assign allocate or hand out U-RNTI values that might be confused with those not centrally managed.

Cell Update requests having an U-RNTI value prefixed with an extended RNC-ID provided to non-supporting HNBs during HNB Registration could be immediately rejected by the HNBs (supporting central U-RNTI management). The HNB-GW might be either informed about the identities of HNBs not supporting central U-RNTI management via management procedures, or decide based on the presence of an information element in the HNB registration procedure requesting the assignment of a number of U-RNTIs.

With respect to FIG. 2, an example message flow is depicted showing the management of the U-RNTI distribution by the HNB-GW.

The HNB can be configured to send a HNB registration request to the HNB gateway.

This is shown in FIG. 2 by the message flow 101.

The HNB gateway can be configured to accept the HNB registration request and additionally provide a list of U-RNTI values to the HNB. The HNB is allowed to assign to user equipment associated with the HNB these U-RNTI values without explicitly requesting a value at each user equipment registration from the HNB-GW.

By providing a list of U-RNTI values from the HNB-GW to a specific HNB, the system is controlling the use of these U-RNTI values such that they are not allowed to be used for user equipment attaching to HNBs other than the HNB allocated the U-RNTI values and being served by the same HNB-GW.

The list of U-RNTI values can be passed from the HNB-GW to the HNB within a HNB registration acknowledgment message.

The transmission of the HNB registration acknowledgment message with the list of U-RNTI values for the HNB is shown in FIG. 2 by the message flow 103.

A user equipment can in some embodiments be configured to request an RRC connection with a HNB where U-RNTI values have been assigned. The user equipment can in such embodiments be configured to in some embodiments transmit a RRC connection request to the HNB.

The transmission of the RRC connection request is shown in FIG. 2 by message flow 105.

The HNB can be configured to answer the RRC connection setup request by assigning or allocating an U-RNTI value from the list previously received from the HNB-GW by the HNB.

In such embodiments by providing one of the U-RNTI values received previously from the HNB-GW to the user equipment, the system is able to determine that this U-RNTI value is no longer for disposal for any other user equipment attaching to the HNB or HNB-GW.

The U-RNTI value can be passed from the HNB to the user equipment within an RRC connection setup message.

The transmission of the RRC connection setup message from the HNB to the user equipment is shown in FIG. 2 by the message flow 107.

The user equipment can further acknowledge the receipt of the connection setup by transmitting a RRC connection setup complete message to the HNB from the user equipment.

The transmission of the RRC connection setup complete message from the user equipment to the HNB is shown in FIG. 2 by message flow 109.

The HNB can in some embodiments register the newly attached user equipment with the HNB-GW. Furthermore in some embodiments the HNB can be configured to inform the HNB-GW about the number of U-RNTI values available for assignment to user equipment.

In some embodiments the registration of the user equipment with the HNB-GW and the information about the U-RNTI value assigned can be passed to the HNB-GW in a user equipment registration request message.

The user equipment registration request message from the HNB to the HNB-GW containing the assigned U-RNTI value is shown in FIG. 2 by message flow 111.

Furthermore the HNB-GW, having accepted the registration, can in some embodiments be configured to determine whether the number of U-RNTI values available at the HNB is below a specific threshold value, can provide a new or further list of U-RNTI values to the HNB which can be assigned or allocated to further UE attempting connect to the HNB.

In case the threshold determination decided to assign further U-RNTIs for use by the HNB, the transmission of a user equipment registration acknowledgment message including with the optional list of additional U-RNTI values, is shown in FIG. 2 by message flow 113.

In some embodiments the determination by the HNB-GW of whether the HNB has sufficient number of U-RNTI values and the dynamic allocation and monitoring of U-RNTI values is able to prevent the HNB from having to explicitly request additional U-RNTI values during a RRC connection setup operation and avoid the delay occurring during RRC setup.

In some embodiments the HNB-GW can be configured to reassign a specific or certain U-RNTI value to another UE. For example this can be implemented by providing a list containing a once used value assigned to a different UE. This reassignment can be configured to occur either after explicit release of the specific U-RNTI value or in some embodiments where there is no explicit UE deregistration received by the HNB-GW after a deployment specific amount of time. The amount of time or timer required can be any suitable operator decided period or other determined time period.

With respect to FIG. 3, an example management function operation with respect to a cell update operation is shown. The example shows message flows between a user equipment 5, a first HNB HNB#1, a second HNB HNB#2, and a HNB-GW 15. In this example the actions to be taken by the HNB-GW to keep track of the HNB that is currently maintaining the context related to a given U-RNTI value as the user equipment is in an RRC connection is shown.

In this example the first HNB, HNB #1, transmits a HNB registration request which in some embodiments comprises a U-RNTI count indication to the HNB-GW (101*a*) and in response, the HNB-GW transmits a HNB registration acknowledgment message back to the first HNB, HNB #1 with an initial list of U-RNTI values to be used by the HNB #1 (103*a*).

In some embodiments the HNB-GW management function can further be configured to perform an update of the U-RNTI database whereby the HNB-GW generates a mapping of the U-RNTI values associated with a HNB to the HNB identification value, HNB-ID, or suitable link. The updating operation shown in FIG. 3 by step 201 can be configured to be performed in response to a trigger event such as HNB U-RNTI assignment or allocation.

Similarly a second HNB, HNB #2, can also request a HNB registration request to the HNB-GW (message flow 101*b*) and receive a HNB registration acknowledgement with a different initial list of U-RNTI values (message flow 103*b*). A updating operation furthermore can in some embodiments be performed for any further list of U-RNTI value assignment or allocation.

The user equipment can as described with respect to FIG. 2 request RRC connection (message flow 105) to the HNB, for example HNB#1. The HNB can respond with a RRC connection setup response assigning one out of the list of allocated U-RNTI value (message flow 107), and the UE transmit a RRC connection setup complete message to the HNB #1 (message flow 109).

Furthermore as described with respect to FIG. 2 the user equipment registration request message is generated in the first HNB and sent to HNB-GW containing the previously (message flow 107) allocated U-RNTI value (message flow 111) and the registration acknowledgment message sent from the HNB-GW to the HNB (as shown by the message flow 113).

In some embodiments the HNB-GW management function can be configured, on receiving a UE registration request from a HNB, to further update the U-RNTI database by marking the specific U-RNTI value as used by the HNB-ID value from the UE registration request.

The updating of the U-RNTI entry by the HNB-ID using the U-RNTI value is shown in FIG. 3 by step 203.

It would be understood that ideally the HNB-ID value which initially assigns the U-RNTI value should match the previous mapping of U-RNTI value and HNB-ID.

Furthermore in some embodiments when receiving the UE registration message containing the assigned U-RNTI value, the HNB-GW management function can be configured to consider this as confirmation that the HNB is adhering to the use of only the U-RNTI values from the provided range or list.

As described herein in some embodiments the HNB-GW can determine on receiving the UE registration request whether the number of available U-RNTI values is below a determined 'minimum' threshold and allocate further U-RNTI values and piggyback them in the registration acknowledgment message sent from the HNB-GW to the HNB (as shown by the message flow 113).

Furthermore in order that all HNBs supporting non-CELL_DCH mobility, the HNB-GW can also be configured to take appropriate management action where the UE registration does not comprise an acceptable U-RNTI value.

In the following example, the user equipment can move from a CELL_DCH state to another state such as a CELL_FACH state. This is shown in FIG. 3 by the step 211.

Furthermore at some later time the user equipment can attempt to start a cell update with a second HNB, HNB #2. This is shown in FIG. 3 by step 213.

This cell update process can in some embodiments cause the user equipment to transmit an RRC cell update message containing the U-RNTI value allocated by the first HNB HNB#1 to the second HNB, HNB #2.

The transmission of the RRC cell update message is shown in FIG. 3 by the message flow 251.

It would be understood that the second HNB, HNB#2 on determining that the context is not one that it is allocated can be configured to determine the node containing the context.

In some embodiments the node currently storing and maintaining the UE context is controlled by another HNB than that receiving the Cell update message as shown by the block 253. In such embodiments the second HNB, HNB #2, transmits a message containing the U-RNTI value to the HNB-GW (message flow 261). This value can, for example, be contained within a HNBAP message to the HNB-GW. The HNB-GW when receiving the message containing the U-RNTI value can be configured to look-up or consult its U-RNTI database to retrieve information about the last HNB the user equipment was attached to. In some embodiments the result of this information is then passed back to the HNB requesting the information.

The look-up and transmission to the requesting HNB is shown in FIG. 3 by step 262, where the transmission of the information is shown in message flow 263.

Thus for example when the context stored is at HNB #1, this information can be passed from the HNB-GW to the second HNB, HNB #2, in the form of a HNBAP message.

Furthermore the second HNB, HNB #2, can then be configured to transmit a UE context request message from the second HNB to where the information points, in this example the first HNB, HNB #1 (shown by message flow 265).

In some embodiments the HNB-GW directly controls the relocation procedure. In such embodiments, as shown by the block 255, the U-RNTI value is passed from the requesting HNB, for example HNB #2, to HNB-GW (as shown by message flow 271), the HNB-GW checks the U-RNTI entry to retrieve the HNB having the UE context (as shown in step 272) and then the HNB-GW updates information where the UE context related to the U-RNTI value is available (as shown in step 274) before transmitting a UE context request for the U-RNTI value directly to the last known HNB (in this example HNB#1 as shown by message flow 275).

Following the receipt of the request the RNSAP relocation procedure can be performed as shown in step 276 resulting in the transferring of the UE context to the target HNB, which in this example is HNB #2.

Figure 4B:
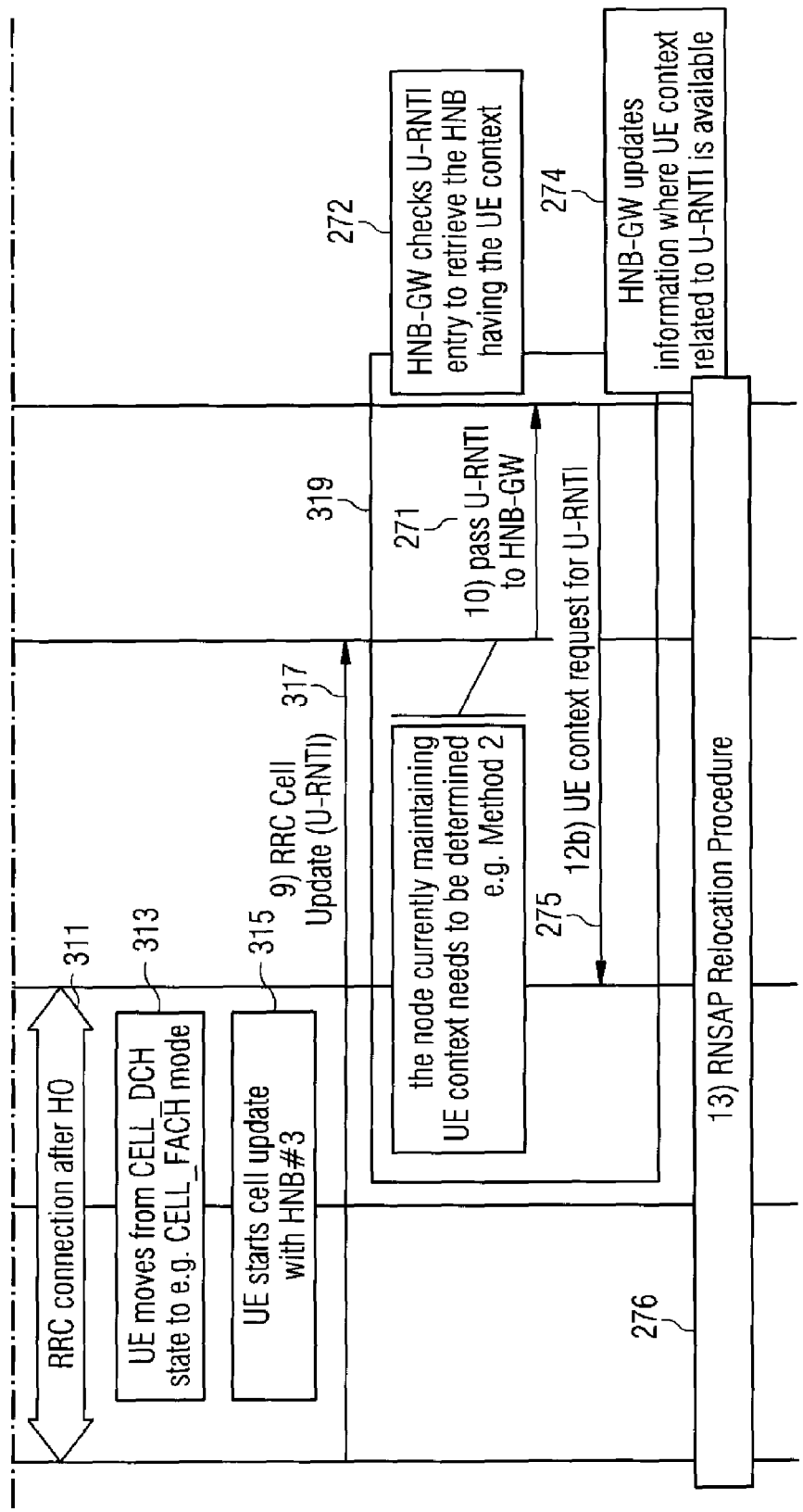

With respect to FIG. 4, the U-RNTI coordination performed by the HNB-GW management function for an example handover followed by a cell update to other HNBs is shown. In the example shown in FIG. 4, there are three HNBs associated with a HNB-GW. A first HNB, HNB #1, a second HNB, HNB #2, and a third HNB, HNB #3. Each of the HNBs are configured to transmit a HNB registration request (shown by message flow 101) and receive as part of a HNB registration acknowledgement an initial list of U-RNTI values (shown by message flow 103).

As described herein the HNB-GW can be configured to maintain a mapping or updating of the U-RNTI values to HNB identification values in the database such that the HNB-GW maintains a centralised list of which U-RNTI values are currently available for use by an associated HNB (shown by step 201).

Furthermore for example a user equipment configured to request an RRC connection with the first HNB, HNB #1, by transmitting a RRC connection request (as shown in message flow 105), receiving an RRC connection setup containing a U-RNTI value (as shown in message flow 107), transmitting an RRC connection setup complete message to the HNB #1 (as shown in message flow 109). The HNB furthermore in some embodiments then registers the user equipment at the HNB-GW by transmitting a UE registration request (containing the U-RNTI value used or allocated to the user equipment) (as shown in message flow 111), the HNB-GW management function is configured to update information where the UE context related to the U-RNTI value is available, thus marking that the U-RNTI value is in use with a designated HNB as shown in step 301 (similar to 203).

Furthermore as described herein in some embodiments the HNB-GW can be configured to assign further U-RNTI values where the number of unused RNTI values is below a threshold or criteria such as shown in step 303 and furthermore transmit this optionally additional list of U-RNTI values in the UE registration acknowledgement message (as shown in message flow 113).

In this example the UE is handed over to the second HNB, HNB #2. As part of this handover process the HNB-GW management function in some embodiments updates this information in the U-RNTI mapping table. The handover process is summarised in step 305 with the second HNB, HNB #2, transmitting an update regarding the currently serving HNB information message for the U-RNTI value to the HNB-GW in message flow 307 and the HNB-GW updating information where the UE context related to U-RNTI value is available based on the update serving HNB information in step 309. In some embodiments both the initial allocator HNB and also the new or latest HNB are identified as being associated with the U-RNTI value in the database.

In this example at some point, the RRC connection after handover is served between the HNB #2 and the UE. The operation of RRC connection after handover is shown in FIG. 4 by step 311.

It would be understood that depending on the handover procedure, the HNB-GW may be implicitly able to update the U-RNTI information database. However in the example shown the information is transmitted or received via the HNB-GW about the new serving HNB using a HNBAP message conveying this information. Furthermore, depending on the handover procedure, the HNB-GW management function could in some embodiments be configured to implicitly update the U-RNTI information database. However in the example shown the HNBAP message conveying the information is acted on by the HNB-GW to update the information about the new serving HNB.

In other words whether or not the message is generated or transmitted from the new serving HNB or used at the HNB-GW is configuration based.

Furthermore in the following example the user equipment moves from a CELL_DCH state to a CELL_FACH mode shown in step 313 (similar to step 211).

When the UE starts a cell update with the further HNB, HNB #3, as shown in step 313, the UE can be configured to transmit an RRC cell update message containing the U-RNTI value to the third HNB, HNB #3, as shown by message flow 317. In the following example, a direct control embodiment is shown where the third HNB, HNB #3, is configured to transmit, via a HNBAP message a request to the HNB-GW containing the U-RNTI value. The HNB-GW can then be configured to check or determine the U-RNTI entry in the database to retrieve the HNB having the UE context, such as shown in step 272, which in this example is the second HNB, HNB #2. The HNB-GW then can be configured to update the information where the user equipment context related to the U-RNTI value is available, in other words HNB #3 shown in step 274 and further transmit a context request directly for the U-RNTI value to the last active context HNB value, which in this case is a message transmitted from the HNB-GW to the HNB #2 for a U-RNTI value as shown in message flow 275.

There follows a RNSAP relocation procedure, as shown in step 276 resulting in transferring the UE context to the target HNB (HNB #3).

Figure 5B:
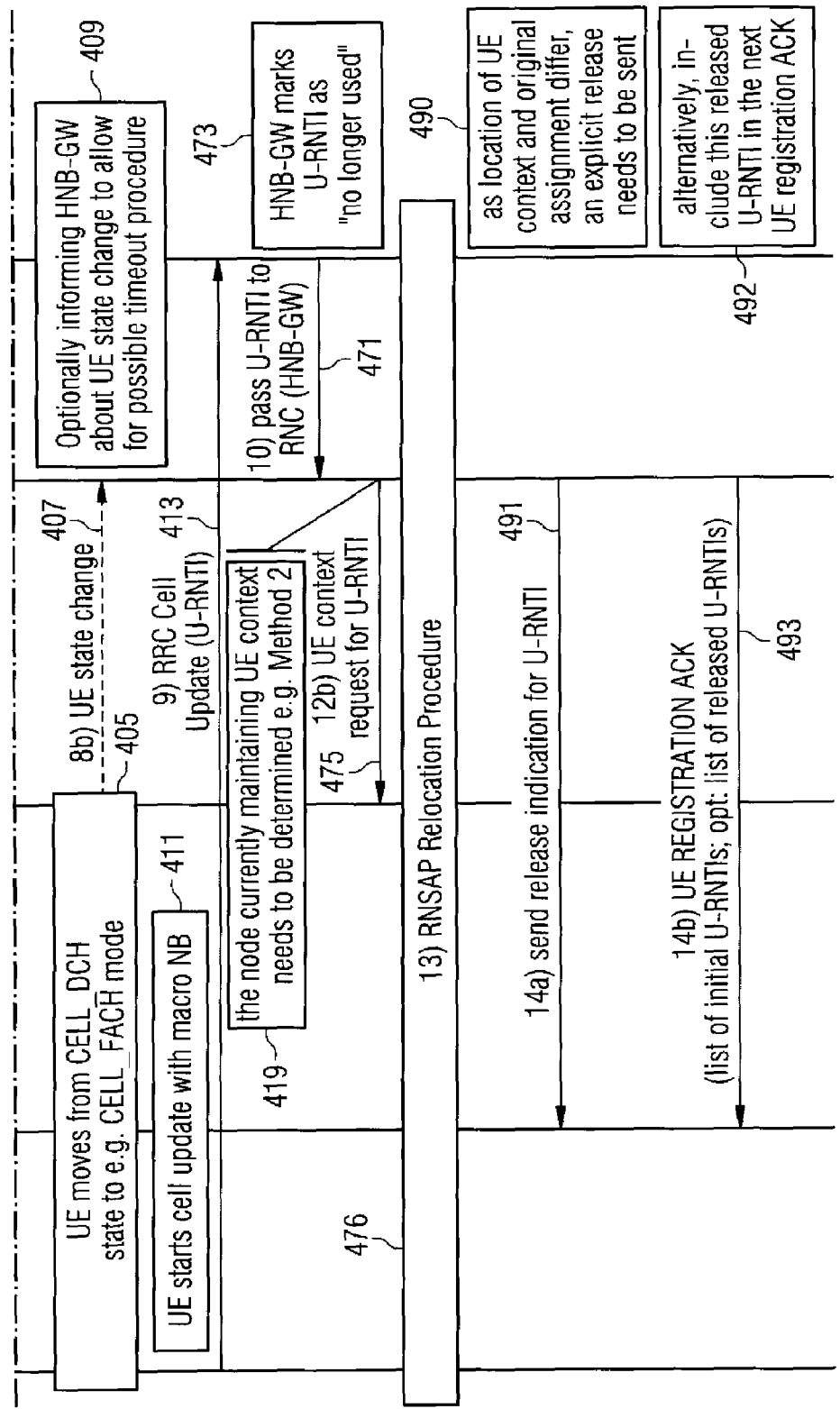

With respect to FIG. 5 a further example of the U-RNTI coordination management functions at the HMB-GW is shown with respect to a handover followed by HNB to a macro node B.

In the example shown in FIG. 5, there are two HNBs associated with a HNB-GW. A first HNB, HNB #1 and a second HNB, HNB #2. Each of the HNBs are configured to transmit a HNB registration request (shown by message flow 101) and receive as part of a HNB registration acknowledgement an initial list of U-RNTI values (shown by message flow 103).

As described herein the HNB-GW can be configured to maintain a mapping or updating of the U-RNTI values to HNB identification values in the database such that the HNB-GW maintains a centralised list of which U-RNTI values are currently available for use by an associated HNB (shown by step 201).

Furthermore for example a user equipment configured to request an RRC connection with the first HNB, HNB #1, by transmitting a RRC connection request (as shown in message flow 105), receiving an RRC connection setup containing a U-RNTI value (as shown in message flow 107), transmitting an RRC connection setup complete message to the HNB #1 (as shown in message flow 109). The HNB furthermore in some embodiments then registers the user equipment at the HNB-GW by transmitting a UE registration request (containing the U-RNTI value used or allocated to the user equipment) (as shown in message flow 111), the HNB-GW management function is configured to update information where the UE context related to the U-RNTI value is available, thus marking that the U-RNTI value is in use with a designated HNB as shown in step 301 (similar to 203).

Furthermore as described herein in some embodiments the HNB-GW can be configured to assign further U-RNTI values where the number of unused U-RNTI values is below a threshold or criteria such as shown in step 303 and furthermore transmit this optionally additional list of U-RNTI values in the UE registration acknowledgement message (as shown in message flow 113).

In this example the UE is handed over to the second HNB, HNB #2. As part of this handover process the HNB-GW management function in some embodiments updates this information in the U-RNTI mapping table. The handover process is summarised in step 305 with the second HNB, HNB #2, transmitting an update serving HNB information message for the U-RNTI value to the HNB-GW in message flow 307 and the HNB-GW updating information where the UE context related to U-RNTI value is available based on the update serving HNB information in step 309. In some embodiments both the initial allocator HNB and also the new or latest HNB are identified as being associated with the U-RNTI value in the database.

In this example the user equipment moves from a CELL_DCH state to a CELL_FACH mode shown in step 405. However in this example the state change is determined in the HNB and pass the state value associated with the U-RNTI value to the HNB-GW as shown by the message flow 407. Furthermore this state value when received by the HNB-GW can trigger a HNB-GW database updating operation whereby the U-RNTI value is mapped to the state received. This can in some embodiments be used by the HNB-GW for possible timer or timeout procedures to be implemented. This updating operation is shown in FIG. 5 by step 409.

When the UE starts a cell update with the macro node B, NB, as shown in step 411, the UE can be configured to transmit an RRC cell update message containing the U-RNTI value to macro node B as the target access node (as shown in message flow 413). The node B then can be configured to, on receiving the RRC cell update message, determine the concerned HNB-GW (based on the HNB-GW RNC identifier value and pass the U-RNTI request message to the HNB-GW (as shown in message flow 471).

The HNB-GW can then be configured to check or determine the U-RNTI entry in the database to retrieve the HNB currently storing and maintaining the UE context (such as shown in step 419) which in this example is the second HNB, HNB #2. The HNB-GW then can be configured to update the information where the user equipment context related to the U-RNTI value is available, in other words marking the U-RNTI as being available for the HNB-GW to allocate shown in step 473 and further transmit a context request directly for the U-RNTI value to the last active context HNB value, which in this case is a message transmitted from the HNB-GW to the HNB #2 for a U-RNTI value as shown in message flow 475.

The "last" HNB in this example is not the "initial" HNB that was granted the right to assign this U-RNTI. Therefore the information database can in some embodiments as described herein comprise at least information about two HNBs, the one the U-RNTI was initially assigned to the UE and the last HNB the UE was attached to. Reception of this message triggers updating the U-RNTI information database at the HNB-GW to reflect the latest HNB the UE was attached to.

There follows a RNSAP relocation procedure, as shown in step 476 resulting in transferring the UE context to the target access node (NB).

In some embodiments as the HNB-GW management function can be configured to having received the message containing the U-RNTI request from a macro NB, the HNB-GW can be configured to inform the concerned HNB which was initially granted the right to use this U-RNTI, to consider this U-RNTI as "available" again.

In some embodiments this information can be passed explicitly for example by using a HNBAP message such as shown in message flow 491.

In some embodiments the information can be passed implicitly by introducing a new Information element in the UE REGISTRATION ACKNOWLEDGEMENT message containing those U-RNTIs that are "available" again as the UE was handed over to a macro NB. The for example in some embodiments the available again U-RNTI values can be indicated by placing the "available" U-RNTI into the list sent as part of the UE registration acknowledgement message as shown in message flow 493.

Figure 6B:
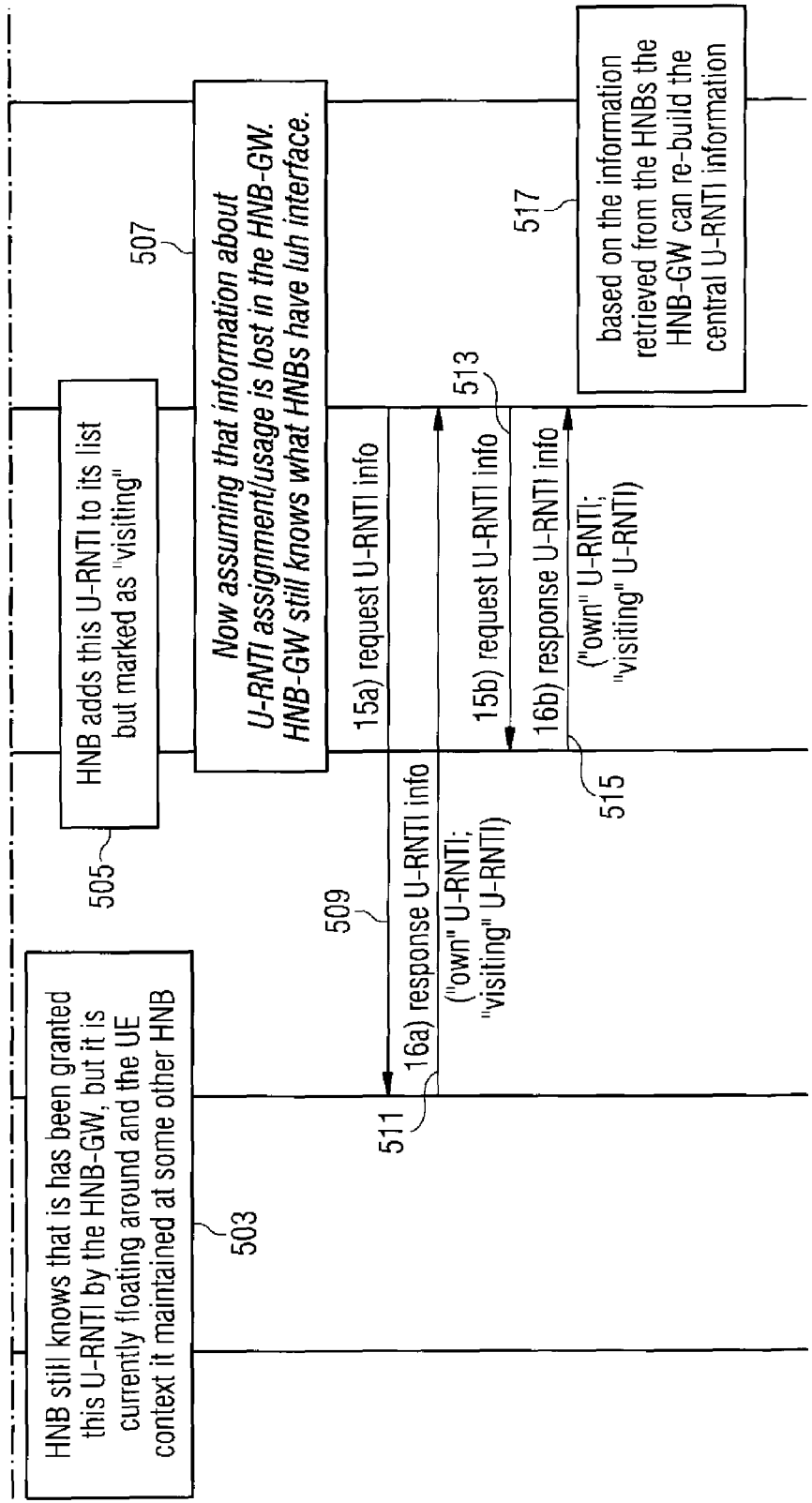

With respect to FIG. 6 a HNB-GW management function initiated auditing operation for the U-RNTI management table is shown.

In the example shown in FIG. 6, there are two HNBs associated with a HNB-GW. A first HNB, HNB #1 and a second HNB, HNB #2. Each of the HNBs are configured to transmit a HNB registration request (shown by message flow 101) and receive as part of a HNB registration acknowledgement an initial list of U-RNTI values (shown by message flow 103).

As described herein the HNB-GW can be configured to maintain a mapping or updating of the U-RNTI values to HNB identification values in the database such that the HNB-GW maintains a centralised list of which U-RNTI values are currently available for use by an associated HNB (shown by step 201).

Furthermore for example a user equipment configured to request an RRC connection with the first HNB, HNB #1, by transmitting a RRC connection request, receiving an RRC connection setup containing a U-RNTI value, transmitting an RRC connection setup complete message to the HNB #1. The HNB furthermore in some embodiments then registers the user equipment at the HNB-GW by transmitting a UE registration request (containing the U-RNTI value used or allocated to the user equipment) (as shown in message flow 111), the HNB-GW management function is configured to update information where the UE context related to the U-RNTI value is available, thus marking that the U-RNTI value is in use with a designated HNB as shown in step 301 (similar to 203).

Furthermore as described herein in some embodiments the HNB-GW can be configured to assign further U-RNTI values where the number of unused RNTI values is below a threshold or criteria such as shown in step 303 and furthermore transmit this optionally additional list of U-RNTI values in the UE registration acknowledgement message (as shown in message flow 113).

In this example the UE is handed over to the second HNB, HNB #2. As part of this handover process the HNB-GW management function in some embodiments updates this information in the U-RNTI mapping table. The handover process is summarised in step 401 with the second HNB, HNB #2, transmitting an update serving HNB information message for the U-RNTI value to the HNB-GW in message flow 307 and the HNB-GW updating information where the UE context related to U-RNTI value is available based on the update serving HNB information in step 309. In some embodiments both the initial allocator HNB and also the new or latest HNB are identified as being associated with the U-RNTI value in the database.

In this example the HNB is able to determine whether the U-RNTI is one granted by the HNB-GW, in other words owned by the HNB, or one which is currently being served by the HNB but not originally allocated in other words a visiting U-RNTI value. In some embodiments the HNB is configured to record whether a U-RNTI is a 'owned' or 'visiting' U-RNTI value and in some embodiments be configured to maintain such a list as shown in steps 503 and 505.

In the following example the HNB-GW U-RNTI database is lost or corrupted (as shown in step 507).

In some embodiments on determination of a lost or corrupted database the HNB-GW management functions can be configured to transmit a request U-RNTI info from each HNB (as shown in message flows 509 to HNB#1 and 513 to HNB#2) and receive the stored HNB information in terms of 'owned' and 'visiting' U-RNTI values (as shown by the message flows 511 from HNB#1 and 515 from HNB#2).

Then in some embodiments the HNB-GW management function can be configured to rebuild the database of U-RNTI values as shown in step 517.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

Although the application has been described herein above with reference to specific embodiments, it is not limited to these embodiments and no doubt further alternatives will occur to the skilled person, that lie within the scope of the invention as claimed.

The invention claimed is:

1. A method comprising:
maintaining a database of unique radio network identifiers within a home node B gateway for a plurality of radio nodes controlled by the home node B gateway, wherein the unique radio network identifiers uniquely identify radio network termination points of user equipments attached to the plurality of radio nodes controlled by the home node B gateway, and wherein maintaining the database of unique radio network identifiers comprises:
allocating at least one of the unique radio network identifiers to a first radio node controlled by the home node B gateway; and
in response to receiving at least one user equipment registration request, associating, within the database, the allocated at least one unique radio network identifier to a radio node identifier corresponding to the radio node that is currently storing a user equipment context of a user equipment, wherein the at least one unique radio network identifier is initially assigned to the user equipment by the first radio node,
wherein allocating the at least one unique radio network identifier comprises allocating the at least one unique radio network identifier dependent on determining the number of unassigned unique radio network identifiers associated with the radio node identifier, transmitting the user equipment registration request, is less than a determined threshold.

2. The method as claimed in claim 1, further comprising transmitting to the radio node a message comprising the at least one unique radio network identifier.

3. The method as claimed in claim 1, wherein maintaining a database of unique radio network identifiers within a home node B gateway comprises indicating at least one unique radio network identifier initially associated with a radio node identifier has been assigned to a user equipment by the radio node.

4. The method as claimed in claim 1, wherein maintaining a database of unique radio network identifiers within a home node B gateway comprises:
receiving a message comprising a unique radio network identifier from a requesting node;
determining in the database a radio node identifier initially associated with the received unique radio network identifier; and
associating an identifier value dependent on the unique radio network identifier value with the identifier of the requesting node.

5. The method as claimed in claim 4, wherein the requesting node is a different radio node to the radio node initially associated with the unique radio network identifier, and wherein associating the unique radio network identifier value with the requesting node identifier comprises:
defining an owned association with the radio node identifier associated with the unique radio network identifier; and
defining a visiting association with the requesting radio node identifier.

6. The method as claimed in claim 4, wherein the requesting node is a macro node B, and associating the unique radio network identifier value with the requesting node comprises:
updating the database to indicate the unique radio network identifier value is available for further allocation.

7. The method as claimed in claim 6, further comprising informing the radio node that the unique radio network identifier is available for new allocation.

8. The method as claimed in claim 1, wherein maintaining the database of radio network identifiers comprises:
transmitting a request about radio network identifier information to at least one radio node;
receiving a response from the at least one radio node comprising available information about radio network identifiers;
auditing or re-compiling the database of radio network identifiers in the home node B gateway based at least on the response.

9. The method as claimed in claim 8, wherein the response comprises an indication of whether the allocated radio network identifier was initially allocated in response to a registration request.

10. The method as claimed in claim 1, wherein maintaining a database of unique radio network identifiers within a home node B gateway comprises the allocation of radio network identifier values for a home node B having a radio network controller identifier value assigned within a first range of values and ensuring that the assigned radio network identifiers as assigned are collision free compared with those containing a radio network identifier from the second range.

11. The method as claimed in claim 10, wherein the radio network controller identifier value first range of values are identifier values less than a predefined value.

12. The method as claimed in claim 1, wherein the radio node is a home node B.

13. An apparatus comprising at least one processor and at least one memory including computer program code, the at least one memory and computer program code configured, with the at least one processor, to cause the apparatus to:
maintain a database of unique radio network identifiers within a home node B gateway for a plurality of radio nodes controlled by the home node B gateway, wherein the unique radio network identifier uniquely identify radio network termination points of user equipments attached to the plurality of radio nodes controlled by the home node B gateway, and wherein maintaining the database of radio network identifiers causes the apparatus to:
allocate at least one of the unique radio network identifiers to a radio node controlled by the home node B gateway; and
in response to receiving at least one user equipment registration request, initially associate, within the database, the at least one allocated unique radio network identifier with a radio node identifier corresponding to the radio node that is currently storing a user equipment context of the user equipment;
wherein the allocation of the at least one unique radio network identifier causes the apparatus to allocate at least one unique radio network identifier dependent on determining the number of unassigned unique radio network identifiers associated with the radio node identifier, transmitting the user equipment registration request, is less than a determined threshold.

14. The apparatus as claimed in claim 13, further causes to perform transmitting to the radio node a message comprising the at least one unique radio network identifier.

15. The apparatus as claimed in claim 13, wherein maintaining a database of unique radio network identifiers within a home node B gateway causes the apparatus to perform indicating at least one unique radio network identifier initially associated with a radio node identifier has been assigned to a user equipment by the radio node.

16. The apparatus as claimed in claim 13, wherein maintaining a database of unique radio network identifiers within a home node B gateway causes the apparatus to perform:
receiving a message comprising a unique radio network identifier from a requesting node;
determining in the database a radio node identifier initially associated with the received unique radio network identifier; and
associating an identifier value dependent on the unique radio network identifier value with the identifier of the requesting node.

17. The apparatus as claimed in claim 16, wherein the requesting node is a different radio node to the radio node initially associated with the unique radio network identifier, and wherein associating the unique radio network identifier value with the requesting node identifier causes the apparatus to perform:
defining an owned association with the radio node identifier associated with the unique radio network identifier; and
defining a visiting association with the requesting radio node identifier.

18. The apparatus as claimed in claim 16, wherein the requesting node is a macro node B, and associating the unique radio network identifier value with the requesting node causes the apparatus to perform updating the database to indicate the unique radio network identifier value is available for further allocation.

19. The apparatus as claimed in claim 18, further caused to perform informing the radio node that the unique radio network identifier is available for new allocation.

20. The apparatus as claimed in claim 13, wherein maintaining the database of radio network identifiers causes the apparatus to perform:
   transmitting a request about radio network identifier information to at least one radio node;
   receiving a response from the at least one radio node comprising available information about radio network identifiers;
   auditing or re-compiling the database of radio network identifiers in the home node B gateway based at least on the response.

21. The apparatus as claimed in claim 20, wherein the response comprises an indication of whether the allocated radio network identifier was initially allocated in response to a registration request.

22. The apparatus as claimed in claim 13, wherein maintaining a database of unique radio network identifiers within a home node B gateway causes the apparatus to perform the allocation of radio network identifier values for a home node B having a radio network controller identifier value assigned within a first range of values and ensuring that the assigned radio network identifiers as assigned are collision free compared with those containing an radio network identifier from the second range.

23. The apparatus as claimed in claim 22, wherein the radio network controller identifier value first range of values are identifier values less than a predefined value.

24. The apparatus as claimed in claim 13, wherein the radio node is a home node B.

25. A non-transitory computer readable medium comprising computer executable instructions which when run on one or more processors perform the method of claim 1.

26. The method as claimed in claim 1, wherein the unique radio network identifier is a U-RNTI.

27. A method comprising:
   allocating one or more unique radio network identifiers to a first of a plurality of radio nodes controlled by a home node B gateway;
   in response to allocating the one or more unique radio network identifiers, mapping each of the one or more unique radio network identifiers to the first radio node in a database maintained by the home node B gateway;
   maintaining the database at least by:
      indicating a first unique radio network identifier of the allocated unique radio network identifiers is assigned to a user equipment attached to the first radio node, wherein the first unique radio network identifier uniquely identifies a termination point of the user equipment, and
      updating the database to associate the first unique radio network identifier with a second radio node identifier corresponding to a second radio node controlled by the home node B gateway based at least on a user equipment context of the user equipment being transferred from the first radio node to the second radio node.

28. The method as claimed in claim 27, wherein allocating the at least one unique radio network identifier to the first radio node is performed in response to receiving a radio node registration request from the first node.

29. The method as claimed in claim 27, wherein indicating the first unique radio network identifier of the allocated unique radio network identifiers is assigned to the user equipment attached to the first radio node is performed in response to a user equipment registration request from the first node.

30. A non-transitory computer readable medium comprising computer executable instructions which when run on one or more processors perform the method of claim 27.

31. An apparatus comprising at least one processor and at least one memory including computer program code, the at least one memory and computer program code configured, with the at least one processor, to cause the apparatus at least to perform:
   allocating one or more unique radio network identifiers to a first of a plurality of radio nodes controlled by a home node B gateway;
   in response to allocating the one or more unique radio network identifiers, mapping each of the one or more unique radio network identifiers to the first radio node in a database maintained by the home node B gateway;
   maintaining the database at least by:
      indicating a first unique radio network identifier of the allocated unique radio network identifiers is assigned to a user equipment attached to the first radio node, wherein the first unique radio network identifier uniquely identifies a termination point of the user equipment, and
      updating the database to associate the first unique radio network identifier with a second radio node identifier corresponding to a second radio node controlled by the home node B gateway based at least on a user equipment context of the user equipment being transferred from the first radio node to the second radio node.

32. The apparatus as claimed in claim 31, wherein allocating the at least one unique radio network identifier to the first radio node is performed in response to receiving a radio node registration request from the first node.

33. The apparatus as claimed in claim 31, wherein indicating the first unique radio network identifier of the allocated unique radio network identifiers is assigned to the user equipment attached to the first radio node is performed in response to a user equipment registration request from the first node.

* * * * *